April 28, 1925.  
W. R. McGOWEN  
VEHICLE BUMPER  
Filed March 13, 1924

1,535,172

INVENTOR  
William R. McGowen  
By Kay, Totten & Brown,  
Attys.

Patented Apr. 28, 1925.

1,535,172

UNITED STATES PATENT OFFICE.

WILLIAM R. McGOWEN, OF CHICAGO, ILLINOIS, ASSIGNOR TO UNITED STATES CHAIN & FORGING COMPANY, OF PITTSBURGH, PENNSYLVANIA, A CORPORATION OF DELAWARE.

VEHICLE BUMPER.

Application filed March 13, 1924. Serial No. 698,981.

*To all whom it may concern:*

Be it known that I, WILLIAM R. MC-GOWEN, a citizen of the United States, and resident of Chicago, in the county of Cook and State of Illinois, have invented a new and useful Improvement in Vehicle Bumpers; and I do hereby declare the following to be a full, clear, and exact description thereof.

My invention relates to automobile bumpers and more particularly to protective devices for shielding either the ends or the sides of automobiles against damage from collisions.

The object of my invention is to simplify and improve generally devices of this type and more particularly to provide an improved form of attaching means for bumpers.

Figure 1:
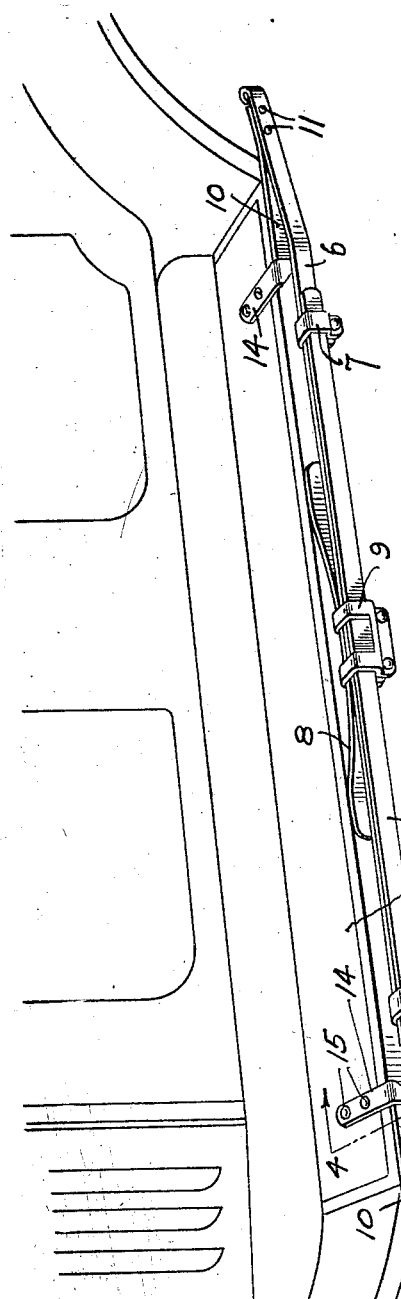
Figure 2:
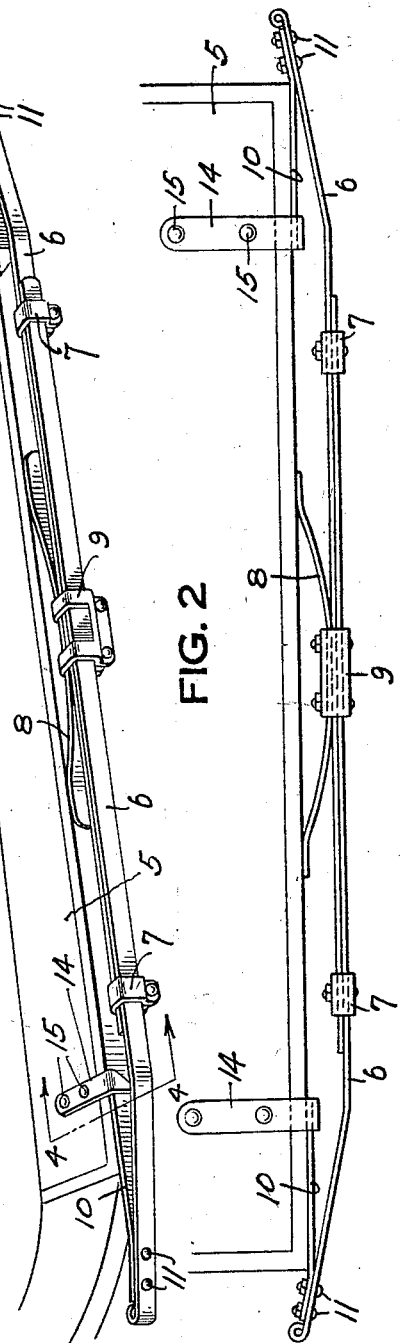
Figure 4:
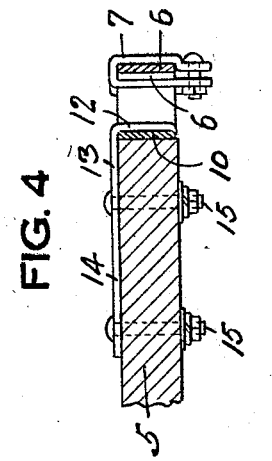
Figure 3:
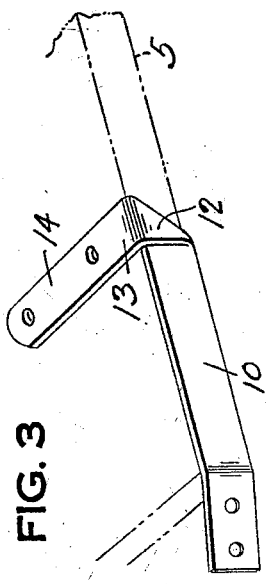

One form which my invention may take is shown in the accompanying drawing wherein Fig. 1 is a perspective view of a portion of an automobile to which my invention is applied; Fig. 2 is a plan view of the bumper of Fig. 1; Fig. 3 is an enlarged detail view of a portion of the bumper; Fig. 4 is a sectional view taken on the line 4—4 of Fig. 1.

While my invention is hereinafter described as applied to the foot board of an automobile, it will be apparent that it may also be employed to protect the ends of an automobile.

The bumper is shown as applied to the foot board 5 of an automobile and comprises complementary members 6 that are secured together by means of clamps 7, and a spring element 8 that is secured to the members 6 by means of a clamp 9. The members 6 and 8 are preferably made of metal bars such as spring steel.

To the outer end of each of the members 6 I secure a strap member 10 of spring steel or similar material by means of rivets or bolts 11. The strap 10, as shown more plainly in Fig. 3, has two right angled bends 12 and 13 beyond which extends the portion 14 that is secured to the foot board by means of bolts 15.

Yielding resistance to shocks is offered by the bumper by reason of the inherent resiliency of the members 6 and 10 which is supplemented by the spring 8. The ends of the bumper project beyond the ends of the foot board 5 in order to furnish protection to the fenders of the car.

Attention is particularly called to the manner in which the members 6 are secured to the foot board, such means comprising as above explained the strap member 10 having the bends 12 and 13. An overlapping effect is produced intermediate these ends as appears more clearly in Fig. 3. Ordinarily the greatest strain is imparted to the member 10 at this point, as, for instance, when a person steps on the bumper. Therefore, this arrangement serves not only to give a double thickness of metal at the point of greatest strain, but also avoids the necessity of providing a separate bracket member for securing the bumper to the foot board. The member 10 serves as a combined bracket for and a yielding portion of, the bumper.

The extended portion 14 of the strap lies in a higher plane than the remaining portion thereof, so that it may be secured to the top of the foot board, while the bumper is disposed directly opposite the edge of the foot board and in abutting engagement therewith. The member 10 also lies against the foot board, and serves to take up substantially the entire force of the impact, to that extent relieving the portion 14 and bolts of heavy strains.

What I claim is:

1. The combination with a bumper bar for vehicles, of a strap member having one end thereof secured to said bar and extending in the same general direction as the bar, the other end of said strap being bent at right angles to the body portion thereof, and lying in a plane vertically offset with respect to the bar, and serving as a bracket for attachment to a vehicle.

2. The combination with a bumper bar for vehicles, of a strap member having one of its ends secured to said bumper bar and having its other end folded over the body portion of said strap, at an angle thereto, and further bent at right angles to the plane of said fold, to serve as a bracket for attachment to a vehicle.

3. The combination with a bumper bar for vehicles, of a bracket therefor comprising a strap member having one end secured to said bar and its other end folded over the body portion of the strap at an angle to said first-named end and, at a point beyond the fold, bent at right angles to the line of the fold.

4. The combination with a bumper bar for vehicles, of a strap member having one end secured to said bar and its intermediate portion disposed in a vertical plane, the other end of said member being folded over the body portion at an angle thereto and further bent at an angle to the first-named angle, the last-named end of said member being adapted for attachment to the vehicle.

5. The combination with a bumper bar for vehicles, of strap members each having one end secured to said bar and extending in substantially the same plane, the other end of each of said straps being turned at right angles to the first-named end and disposed in a plane spaced vertically with respect to said first-named plane, whereby the second-named end may be attached to one side of a supporting member and the bumper bar structure have abutting engagement with an edge of said member.

6. The combination with a bumper bar, of a strap member having one end secured thereto and extending in the same general direction as said bar, the other end of said member being disposed in a different plane than the first-named end, whereby said second-named end may be attached to one surface of a supporting member and the bumper bar structure have engagement with the edge of said supporting member.

7. The combination with a bumper bar adapted to be secured to the edge of an automobile foot board, of a strap member secured to said bumper bar and extending in the same general direction as said bar, the said strap member lying in abutting engagement with the edge of the said foot board, and spaced for a portion of its length from said bar.

In testimony whereof I, the said WILLIAM R. McGOWEN, have hereunto set my hand.

WILLIAM R. McGOWEN.